United States Patent [19]

Takahashi et al.

[11] 4,375,912
[45] Mar. 8, 1983

[54] ELECTRIC CIRCUITS FOR USE IN CAMERA

[75] Inventors: Akira Takahashi, Kawasaki; Shinichiro Koshiishi, Hino, both of Japan

[73] Assignee: Ricoh Company, Ltd., Japan

[21] Appl. No.: 152,764

[22] Filed: May 23, 1980

Related U.S. Application Data

[62] Division of Ser. No. 6,225, Jan. 24, 1979, Pat. No. 4,305,648.

[30] Foreign Application Priority Data

Jan. 25, 1978 [JP] Japan .................................. 53/7554
Jan. 25, 1978 [JP] Japan .................................. 53/7555

[51] Int. Cl.³ .................... G03B 7/083; G03B 17/18; G03B 15/03
[52] U.S. Cl. ........................................ 354/33; 354/34; 354/51; 354/60 L; 354/60 F; 354/127; 354/133; 354/139

[58] Field of Search ............... 354/50, 51, 53, 60 R, 354/60 E, 60 L, 289, 32-35, 27, 60 F, 127, 128, 133, 139, 149

[56] References Cited

U.S. PATENT DOCUMENTS

| | | | |
|---|---|---|---|
| 3,638,543 | 2/1972 | Kondo | 354/35 |
| 3,688,663 | 9/1972 | Uchiyama et al. | 354/34 |
| 3,721,166 | 3/1973 | Yanagi et al. | 354/51 |
| 3,738,237 | 6/1973 | Uchiyama et al. | 354/60 L X |
| 3,958,256 | 5/1976 | Wagensonner et al. | 354/60 L X |
| 4,305,648 | 12/1981 | Takahashi et al. | 354/51 |

*Primary Examiner*—William B. Perkey
*Attorney, Agent, or Firm*—McGlew and Tuttle

[57] ABSTRACT

The electric circuit for use with a camera is capable of controlling exposure and alarming camera vibrations and obviating wrong display of a camera vibration alarm means and improper operation of a shutter of the camera.

3 Claims, 32 Drawing Figures

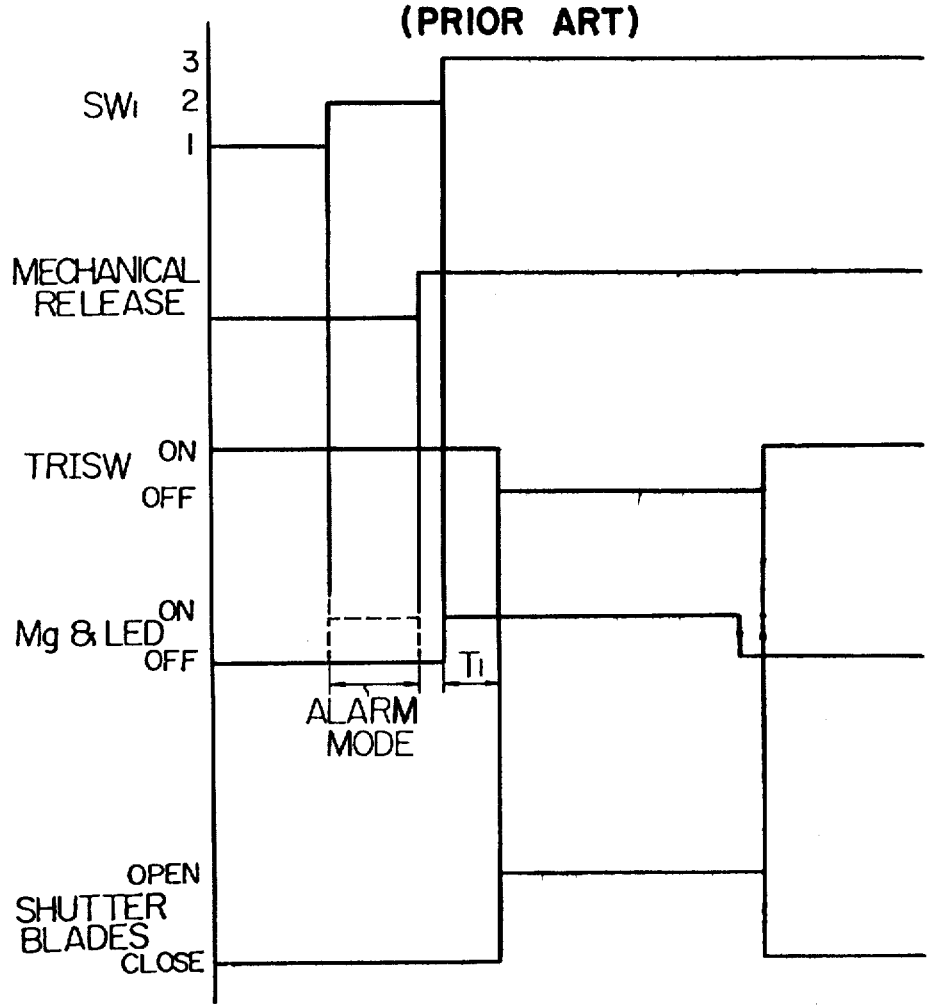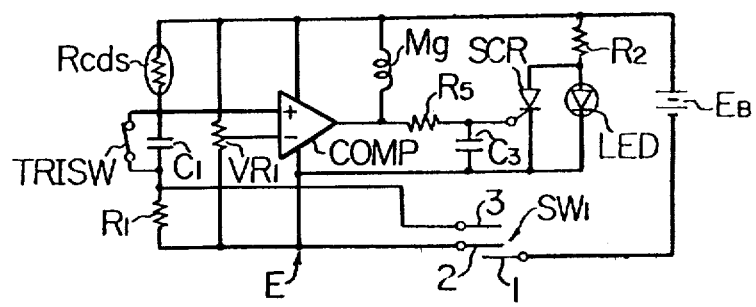

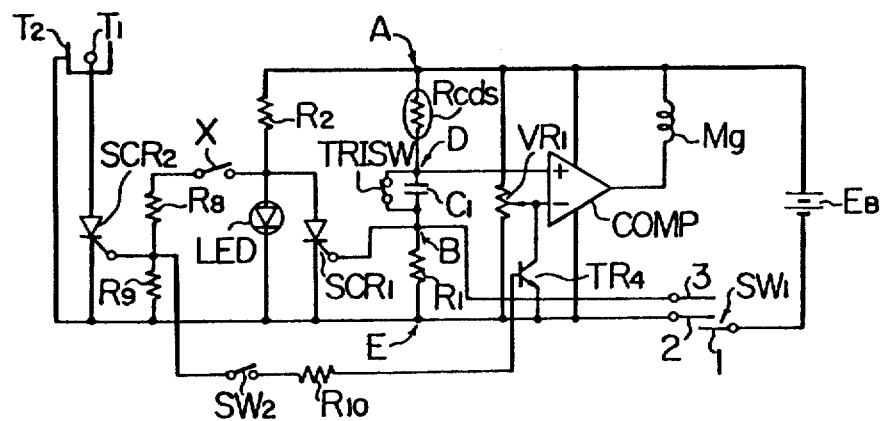
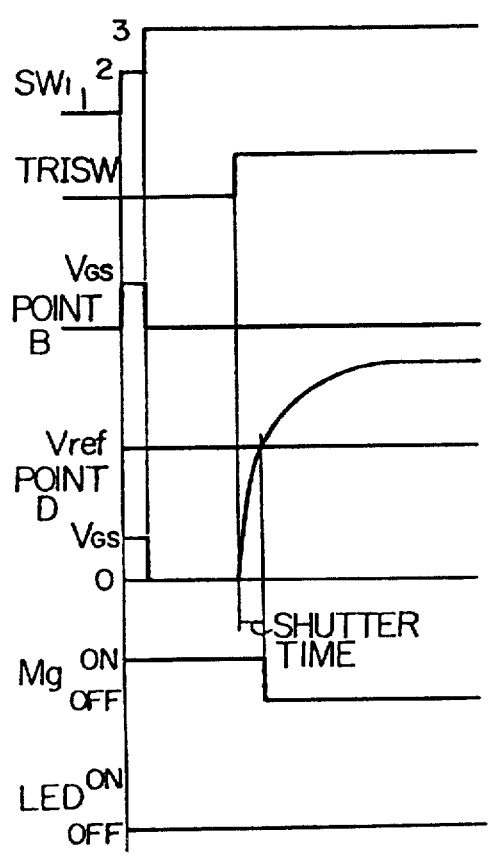
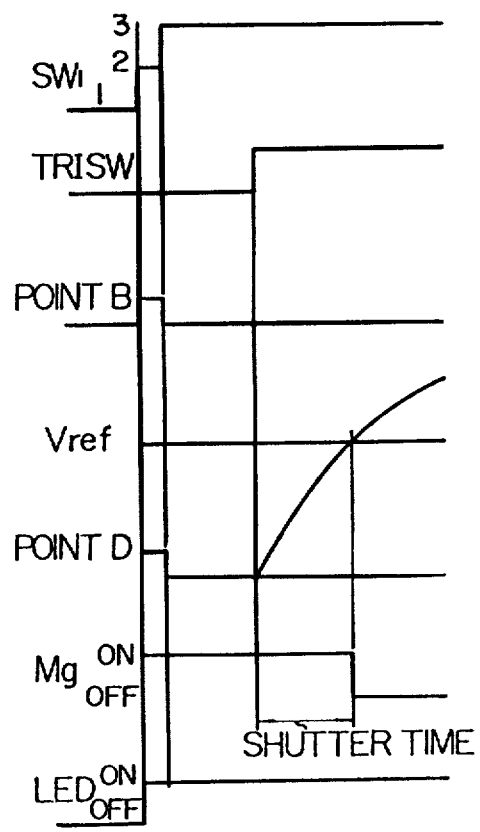

ELECTRIC CIRCUITS FOR USE IN CAMERA

This is a divisional of application Ser. No. 006,225 filed Jan. 24, 1979, now U.S. Pat. No. 42,305,648.

BACKGROUND OF THE INVENTION

The present invention relates to an electric circuit for a camera for controlling exposure and alarming vibrations of the camera.

Conventionally, an electric circuit for a camera for controlling exposure and alarming vibrations of the camera as shown in FIG. 1 is known. The electric circuit is set "vibration alarm mode" when a release button is depressed lightly and contacts 1 and 2 of a switch SW1 are connected and a power source $E_B$ is connected to this electric circuit. In other words, with a trigger switch TR1SW on, a voltage divided by a light receiving element Rcds for exposure photometry and by a resistor R1 for comparison is compared with a reference voltage Vref set by a variable resistor VR1 at a comparator COMP and the output from the comparator COMP is applied to a light emitting diode LED for alarming vibrations of camera through a resistor R2. Therefore, the light emitting diode LED is lighted in the dark and extinguished in the light. When the release button is further depressed, the contacts 1, 2 and 3 of the switch SW1 are all connected so that the electric circuit is set at "timer mode." At this time, since the contacts 2 and 3 of the switch SW1 are connected, the resistor R1 is short-circuited, so that an ordinary timer circuit is formed. With the trigger switch TR1SW on, a magnet Mg for controlling a shutter and a light emitting diode LED are on. Here, the light emitting diode LED is on, irrespective of the surrounding lightness, which may cause a wrong display. When a mechanical release of the shutter is effected at this time, the shutter blades are opened and, at the same time, the trigger switch TR1SW is off, and voltage begins to be integrated by the light receiving element Rcds and an integration condenser C1. When the integrated voltage amounts to the reference voltage Vref, the magnet Mg and the light emitting diode LED are off and the shutter blades are mechanically released and closed, so that a desired shutter time is obtained.

Referring to FIG. 2, there is shown a time chart of the above-mentioned operation. As can be seen from FIG. 2, when the construction of the release button is such that it can be stopped easily within the range in which the above-mentioned wrong display of the light emitting diode LED can be made, the light emitting diode LED is disadvantageously lighted, irrespective of the surrounding lightness when the release button is stopped in the range. Therefore, it is preferable that the stroke of the release button in the range be small as possible. However, when the release mechanism is of a sensor type, the whole stroke is, for example, as small as 1.5 mm, although the normal stroke is in the range of 6 to 8 mm. In this case, it is difficult to adjust the above-mentioned stroke to be sufficiently small. Consequently, it is impossible to obviate the wrong display of the light emitting diode LED.

In order to obviate such wrong display only, the following mechanism could be proposed. Namely, after the mechanical release of the shutter, the switch SW1 is switched to the timer mode. In this case, it is necessary that the magnet Mg be mechanically held before the trigger switch TR1SW is off, that is, before the integration is started, and a period of time T1 of about 10 msec will be necessary for the mechanical holding. Referring to FIG. 3, there is shown a time chart of this operation. As can be seen from FIG. 3, in case it is light enough and the magnet Mg and the light emitting diode LED are off at the "alarm mode" and the above-mentioned period of time T1 is less than 10 msec, the magnet Mg is not in the holding condition, which results in that the magnet Mg works improperly. This could be prevented by actuating a mechanical governor until the trigger switch TR1SW is turned on so that the period of time T1 is lengthened up to more than 10 msec. However, the mechanism would become too complex.

Furthermore, some cameras are provided with a synchronous terminals for connecting a strobotron, in which an X-contact is connected to the synchronous terminals and simultaneously with the mechanical release, the strobotron is lighted with the X-contact on. However, in such a system, the strobotron is lighted when the synchronous terminal is connected to the strobotron even if the subject is light enough.

Furthermore, in an electro-shutter type camera having the X-contact, when part of the wiring of the X-contact is employed instead of the wiring of the electro-shutter, a power source line is employed. Namely, referring to FIG. 4, an electric part 1 for the electroshutter is connected to a battery $E_B$, and a magnet Mg for the electro-shutter is connected between a power source positive line 3 and an output terminal of the electric part 1, and the X-contact 7 is connected between synchronous terminals 5 and 6, with use of part of the power source positive line 3. As to a strobotron, as shown in FIG. 5, the input side of a DC—DC converter 8 is connected to a battery 9, and a diode 10 and a main condenser 11 are connected in series between the output terminals of the DC—DC converter 8. A flash discharge tube 14 and the series circuit comprising a resistor 2 and a trigger condenser 13 are connected in parallel with a main condenser 11. A secondary circuit of a trigger transformer 15 is connected between one terminal of the flash discharge tube 14 and a trigger electrode. Furthermore, there are provided terminals 16 and 17 connected to the synchronous terminals 5 and 6. By the connection of the terminals 16 and 17 to the synchronous terminals 5 and 6, a primary circuit for the trigger condenser 15 is connected in parallel with the trigger condenser 13 through the X-contact 7. Usually, the output of the battery 9 is converted to a high potential by the DC—DC converter 8 and is charged in the main condenser 11 through the diode 10 and, at the same time, in the trigger condenser 13 through a resistor 12. When the terminals 16 and 17 are connected to the synchronous terminals 5 and 6, the X-contact 7 is closed in synchronism with the shutter, whereby the trigger condenser 13 is discharged and the flash discharge tube 14 is triggered so as to be lighted by the discharging of the main condenser 11.

However, when the wiring of the X-contact is performed as mentioned above, normally the voltage charged in the trigger condenser 13 is applied only to a primary side $15_1$ of the trigger transformer 15 when the X-contact 7 is closed as shown in FIG. 29. On the other hand, when the X-contact 7 is closed with part G of the power source positive line (employing for wiring the X-contact) disconnected, the charged voltage in the trigger condenser 13 is applied to the electric part 1 through the battery $E_B$ on the side of the camera as shown in FIG. 30. Furthermore, the inner resistance of the battery 2 is so small that most of the charged voltage in the trigger condenser 13 is applied to the electric part 1. Therefore, the electric part 1 is destroyed by application of a high voltage V1 which is beyond an endurable voltage as shown by solid line in FIG. 28. This is apt to occur particularly when it is necessary to separate the electric part 1 from the magnet Mg and the X-contact 7 and others. In other words, when the electric part 1 and the magnet Mg and the X-contact 7 are incorporated in one unit by connecting them by a connector, or when the magnet, the X-contact and the electric circuit are connected by contacts as in a mirror-tube-retractable type camera, since the power source positive line G is connected to the contacts, improper contact is apt to occur.

SUMMARY OF THE INVENTION

A primary object of the present invention is to provide an electric circuit for a camera for preventing wrong display of a camera vibration alarm means and improper closing of a shutter.

Another object of the invention is to provide an electric circuit for a camera in which wrong display of the camera vibration alarm means and improper closing of a shutter are prevented by use of a switching element having a holding function.

A further object of the invention is to provide an electric circuit for a camera in which a resistor is connected in series with a light receiving element for exposure photometry and in which the camera vibration alarm means is controlled by a transistor, with use of signals from the resistor in order to prevent wrong display of the camera vibration alarm means and improper closing of a shutter.

A further object of the invention is to provide an electric circuit for a camera having synchronous terminals, which is capable of actuating a flash light source only in the dark.

A still further object of the invention is to provide an X-contact circuit for use in a camera, which is capable of preventing damage of electric parts in the camera, which is caused by disconnection of the wirings in the camera.

BRIEF DESCRIPTION OF THE DRAWINGS

FIG. 3 is a timing chart of another circuit of the conventional camera.

FIGS. 10 to 15 are the circuit diagrams of the other embodiment of the invention.

FIGS. 18 and 19 are the circuit diagrams of the further embodiments of the invention.

FIGS. 20 to 22 are the time charts of the embodiment of FIG. 19.

DETAILED DESCRIPTION OF THE PREFERRED EMBODIMENTS

Figure 1:
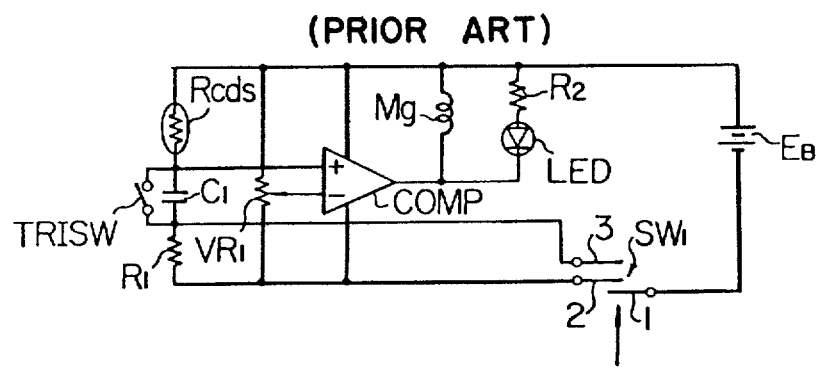
FIG. 1 is a diagram of a circuit of one conventional camera.
Figure 2:
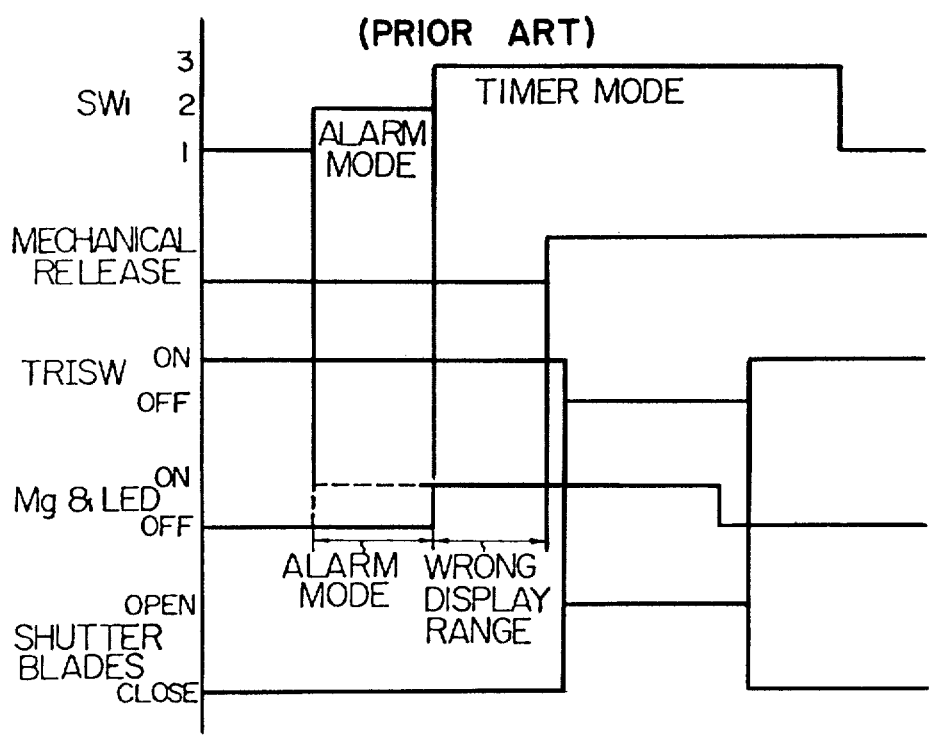
FIG. 2 is a timing chart of the circuit of FIG. 1.
Figure 4:
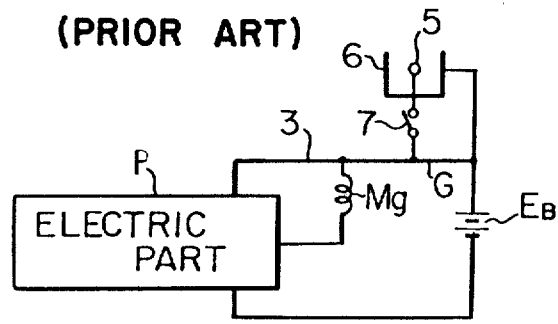
FIG. 4 is a wiring diagram of a circuit of a conventional camera.
Figure 5:
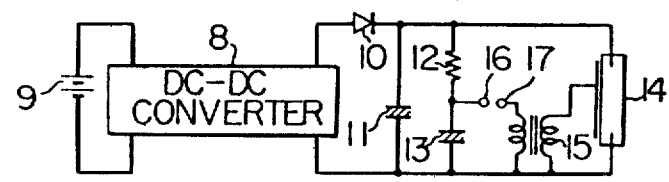
FIG. 5 is a wiring diagram of a strobotron.
Figure 6:
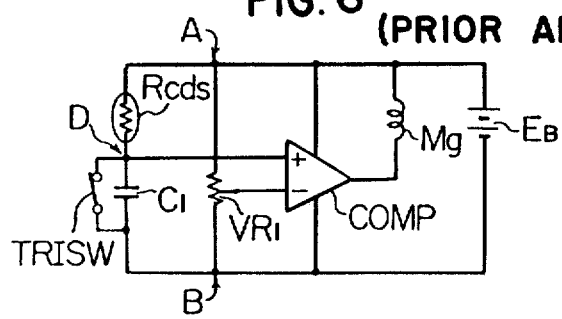
FIG. 6 is a circuit diagram of a timer of an ordinary camera.

In the ordinary timer circuit of a camera, as shown in FIG. 6, a light receiving element Rcds for exposure photometry, which detects the light quantity from a subject, and an integration condenser C1 are connected in series between point A and point B, and a trigger switch TRISW is connected in parallel with the integration condenser C1. Furthermore, a variable resistor VR1 is connected between the point A and the point B, and a sliding terminal of the variable resistor VR1 is connected to a reversing input terminal of a comparator COMP. To a non-reversing input terminal of the comparator COMP, there are connected the light receiving element Rcds and a contact point D of the condenser C1. Power source terminals of the comparator COMP are connected to the points A and B. Furthermore, a magnet Mg for controlling a shutter is connected between an output terminal of the comparator COMP and the point A, and the opposite terminals of a DC power source $E_B$ are connected to the points A and B.

When the trigger switch TRISW is turned on, the output of the comparator COMP is set at a low level and the magnet Mg is energized. With mechanical release of the shutter, the shutter blades are opened and, at the same time, the trigger switch is turned off, so that integration of a power source voltage $E_B$ is started by the light receiving element Rcds and the condenser C1. When the integrated voltage amounts to a reference voltage Vref set by the variable resistor VR1, the output of the comparator COMP is reversed to a high level and the magnet Mg is denergized and with a mechanical stopper released, the shutter blades are closed so that a desired shutter time is obtained. At this time, the timer time T from "off" of the trigger switch TRISW to "on" of the magnet Mg is $$T = -C_1 Rcds \ln\left(1 - \frac{Vref}{E_B}\right) \quad (1)$$

and, since the reference voltage Vref is given by a divided voltage of the power source voltage $E_B$ set by the variable resistor VR1, the reference voltage is given as follows:

$$Vref = \alpha E_B \quad (2)$$

where $\alpha$ is the divided voltage ratio. Therefore, Equation (1) can be rewritten as follows:

$$T = -C_1 Rcds \ln(1-\alpha) \quad (3)$$

This indicates that the timer T has nothing to do with the power source voltage $E_B$ when the power source voltage is not varied during integration. In this case, since the light receiving element Rcds, the condenser C1 and the variable resistor VR1 constitute a bridge circuit, a timer time T can be obtained, irrespective of the variation of the power source voltage.

Figure 7:
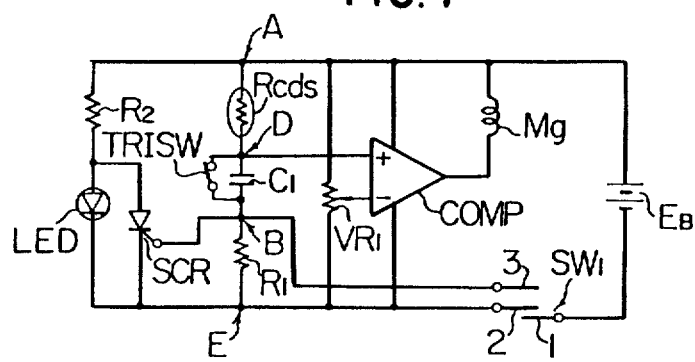
FIG. 7 is a circuit diagram of one embodiment of an electric circuit of a camera according to the invention.

In a first embodiment of the present invention, which is shown in FIG. 7, in the above-mentioned timer circuit, point B is connected to point E through resistor R1, and a variable resistor VR1 is connected between points A and E and, at the same time, the power source terminals of comparator COMP are connected to the points A and E. Furthermore, between the points A and E, there is connected an alarm light emitting diode LED through a resistor R2, and a thyristor SCR is connected in parallel with the light emitting diode LED and a gate of the thyristor SCR is connected to the point B. A contact 1 of a switch SW1 is connected to a negative side terminal of a DC power source $E_B$, and contacts 2 and 3 are respectively connected to the point E and the point B.

Figure 8:
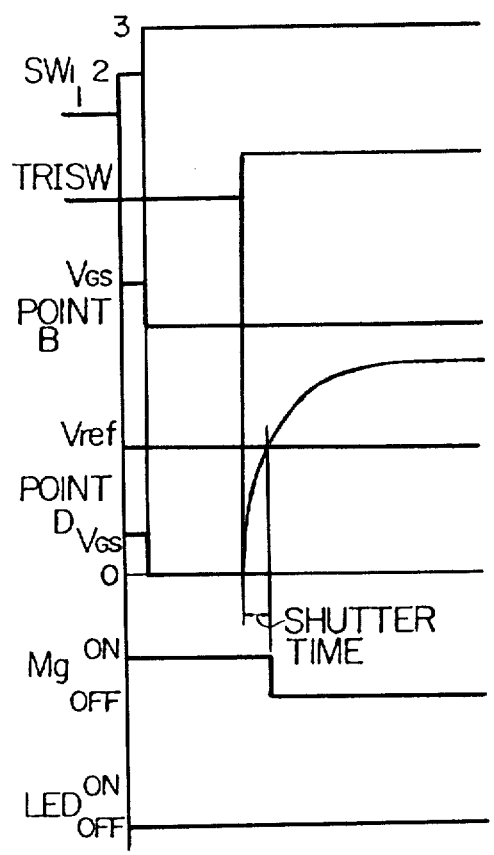
FIGS. 8 and 9 are the timing charts of the embodiment of FIG. 7.
Figure 9:
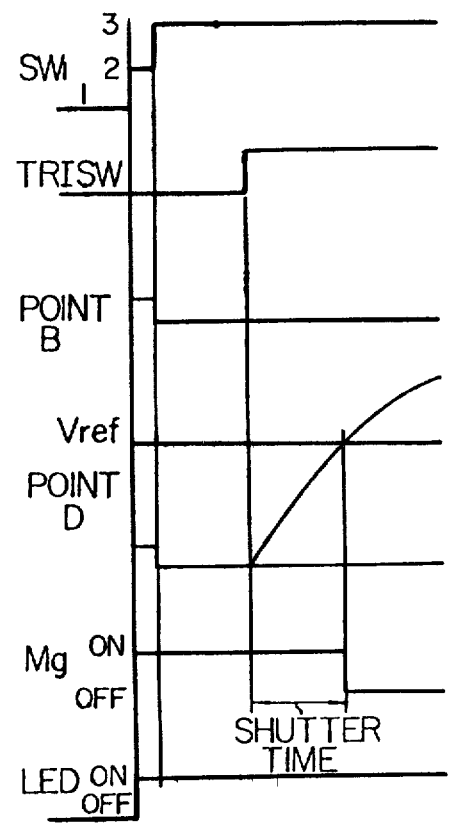

In the thus constructed electric circuit, when the contacts 1 and 2 of the switch SW1 are connected with a light depression of a release button, the DC power source $E_B$ is connected between the points A and E. When a trigger switch TRISW is on, a voltage VGS divided by a light receiving element Rcds and a resistor R1 is applied between the gate and source of the thyristor SCR. Therefore, when the subject is light enough, the light emitting diode LED is short-circuited and extinguished with the thyristor SCR on. However, when it is dark in the surrondings, the light emitting diode is lighted, with the thyristor SCR off, so that the vibrations of camera are alarmed. This is an alarm mode and this state is held by the thyristor SCR irrespective of the stroke of the release button. When the contacts 1, 2 and 3 of the switch SW1 are connected by a deeper depression of the release button, the resistor R1 is short-circuited by the switch SW1 to form a timer circuit in a timer mode. In this case, the timer circuit performs the above-mentioned operation. The operation of the timer circuit in the light is shown in FIG. 8, and that in the dark is shown in FIG. 9.

In this sort of electric circuit of a camera, since the display of the light emitting diode is held by the thyristor SCR, such an adjustment as in the conventional electric circuit becomes unnecessary and wrong display of the light emitting diode and improper operation of a shutter are obviated. There are two types of trigger switches TRISW. One type closes only during shutter setting and the other type closes except during shutter operation. The display of light emitting diode LED is correct when any type of the trigger switch is employed.

Figure 10:
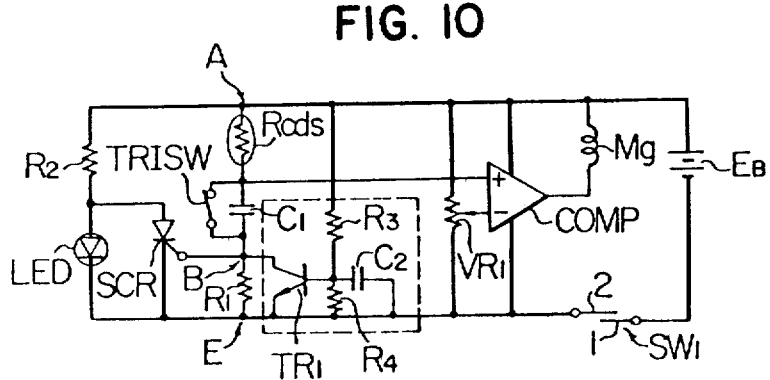

Referring to FIG. 10, there is shown a second embodiment of electric circuit for a camera according to the invention. In this embodiment, the function of short-circuiting of the resistor R1 by the contacts 2 and 3 of the switch SW1 in the first embodiment is electrically performed by a transistor TR1 and an integration circuit within a closed broken line in FIG. 10. The switch SW1 has two contacts 1 and 2. The collector and emitter of the transistor TR1 are connected to two terminals of the resistor R1, and the base of the transistor TR1 is connected to the contact points of the resistors R3 and R4. The resistors R3 and R4 are connected in series between the points A and E, and a condenser C2 is connected in parallel with a resistor R4. With the switch SW1 on, power source voltage is integrated by the condenser C2 and the resistors R3 and R4 and, due to the output, the transistor TR1 is turned off and an alarm mode is set, so that the above-mentioned operation is performed. When the output of the integration circuit becomes above a predetermined voltage, the resistor R1 is short-circuited with the transistor TR1 on, so that a timer circuit is formed. In this embodiment, since the switch SW1 has two contacts, the control of the stroke is made easier in comparison with the first embodiment.

Referring to FIG. 11, there is shown a third embodiment of the invention. In this embodiment, the gate of the thyristor SCR is connected to the output terminal of the comparator COMP through a resistor R5 and the condenser C3 is connected between the gate of the thyristor and the point E. Therefore, at the time of the alarm mode, a divided voltage of the light receiving element Rcds and the resistor R1 is compared with a reference voltage Vref set by the variable resistor VR1 in the comparator COMP and the output of the comparator COMP is applied between the gate and the source of the thyristor SCR. Therefore, in the dark, the light emitting diode LED is lighted with the thyristor off while, in sufficient light, the light emitting diode LED is extinguished with the thyristor SCR on. The condenser C3 serves to prevent the thyristor SCR from being erroneously turned on due to the operation lag of the comparator COMP in the dark. In the first embodiment of the invention, the vibrations of the camera are judged by use of the voltage between the gate and the source of the thyristor SCR. The judgment greatly depends upon the voltage. However, in the third embodiment, since the vibrations of the camera is judged by use of the comparator COMP, the voltage dependence of the judgment is small.

Figure 12:
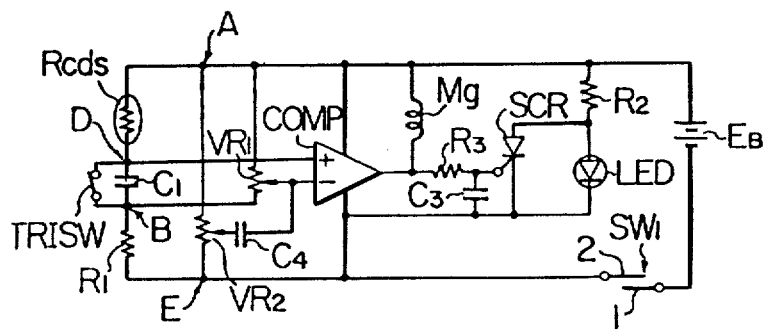

Referring to FIG. 12, there is shown a fourth embodiment of the invention. In this embodiment, the point B is connected to the point E through the resistor R1 and the power source terminals of the comparator COMP are connected to the points A and E. Furthermore, the switch SW1 has two contacts 1 and 2, and the contact 1 is connected to the negative side terminals of the DC power source $E_B$ while the contact 2 is connected to the point E. The opposite terminals of the variable resistor VR2 are connected to the points A and E, and the sliding terminal of the variable resistor VR2 is connected to the reverse input terminal of the comparator COMP through the condenser C4. The camera vibration alarm light emitting diode LED is connected between the points A and E through the resistor R2, and the thyristor SCR is connected in parallel with the light emitting diode LED. The gate of the thyristor SCR is connected to the output terminals of comparator COMP through the resistor R3, and the condenser C3 is connected between the gate of the thyristor SCR and the point E.

In the thus formed electric circuit, when the contacts 1 and 2 of the switch SW1 are connected with a light depression of the release button, the DC power source $E_B$ is connected between the points A and E and, with the trigger switch TRISW on, a divided voltage of the light receiving element Rcds and the resistor R1 is applied to the comparator COMP. On the other hand, by putting the switch SW1 to work, the reference voltage set by the variable resistor VR2 is transiently applied to the comparator COMP through the condenser C4, and the reference voltage and the divided voltage are compared with each other by the comparator COMP, so that the output of the comparator COMP is applied between the gate and the source of the thyristor SCR. Therefore, when the subject is light, the light emitting diode LED is extinguished, with the thyristor on and, in the dark, the light emitting diode LED is lighted, with the thyristor SCR off, so that the camera vibration alarm is performed, which is the alarm mode. This state is held by the thyristor SCR irrespective of the stroke of the release button. In this case, the condenser C3 serves to prevent the thyristor SCR from being erroneously turned on in the dark, which may be caused by an operating lag of the comparator COMP. The timer circuit is likewise operated as mentioned previously.

Figure 13:
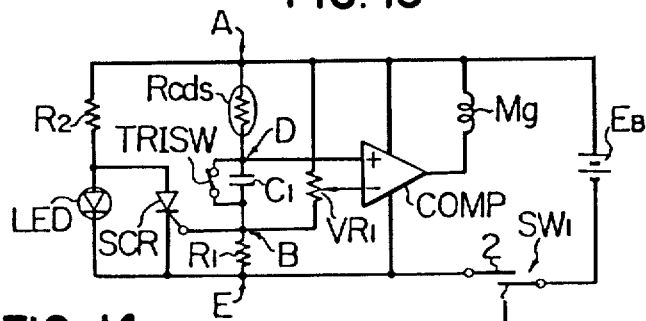

Referring to FIG. 13, there is shown a fifth embodiment of the invention. In this embodiment, as shown in FIG. 13, the variable resistor VR2, the condensers C4 and C3, and the resistor R3 in the fourth embodiment are omitted and the gate of the thyristor SCR is connected to the point B. Therefore, in the alarm mode, a divided voltage of the light receiving element Rcds and the resistor R1 is directly applied between the gate and the source of the thyristor SCR, so that the thyristor SCR and the light emitting diode are operated as mentioned above. Furthermore, in the timer mode, the point B is locked at the potential of about 0.65 V, which is the voltage between the gate and the source of the thyristor SCR, so that the shutter time is accurately maintained.

Instead of the above-mentioned thyristor, switching elements having a holding function, such as a programmable uni-junction transistor can be employed.

Figure 14:
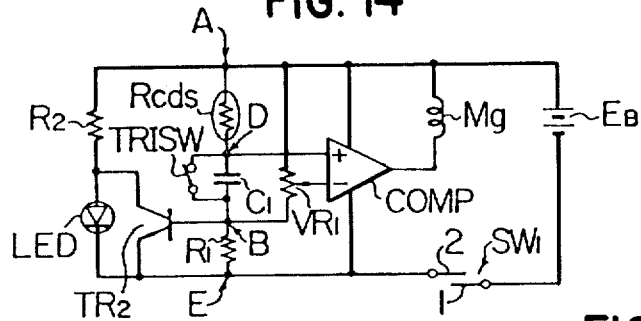

In FIG. 14, there is shown a sixth embodiment of the invention. In the timer circuit of this embodiment, the point B is connected to the point E through the resistor R1 and, between the point E and DC power source $E_B$, there is inserted the switch SW1 having two contacts 1 and 2. Furthermore, between the points A and E, there is connected vibration alarm light emitting element LED through the resistor R2, and the transistor TR2 is connected in parallel with the light emitting diode LED, and the base of the transistor TR2 is connected to the point B.

In the thus constructed electric circuit of a camera, when the contacts 1 and 2 of the switch SW1 are connected with each other with a light depression of the release button, the DC power source $E_B$ is connected between the points A and E. With the trigger switch TRISW on, a power source voltage divided by the light receiving elements Rcds and the resistor R1 is applied between the base and the emitter of the transistor Tr2. Therefore, when the subject is light, the light emitting diode LED is extinguished with the transistor TR2 on while, in the dark, the light emitting diode LED is lighted with the transistor TR2 off, so that camera vibration alarm is made. This is the alarm mode. The timer circuit is operated in the same manner as mentioned previously.

In the electric circuit of this type, a resistor is connected in series with a photometric bridge in the timer circuit and, by use of the signals produced by the resistor, the light emitting diode LED is controlled, with the use of the transistor TR2 and, at the same time, the switch SW1 having two contacts 1 and 2 is employed. Therefore, the previously mentioned adjustment in the conventional electric circuit becomes unnecessary, so that wrong display of the light emitting diode and improper operation of the shutter are obviated. Furthermore, when a trigger switch TRISW is employed, which is turned on except during shutter operation, the light emitting diode LED effects correct display after shutter operation is finished. It is conceivable to use a thyristor instead of the transistor TR2. In this case, the thyristor is erroneously turned on by noises and other factors, so that the light emitting diode LED is extinguished and the holding is effected. However, in this embodiment, since the transistor TR2 is employed, holding of the wrong display is not performed.

Figure 15:
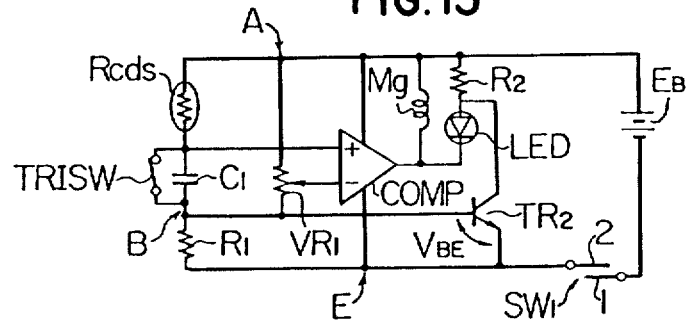
Figure 16:
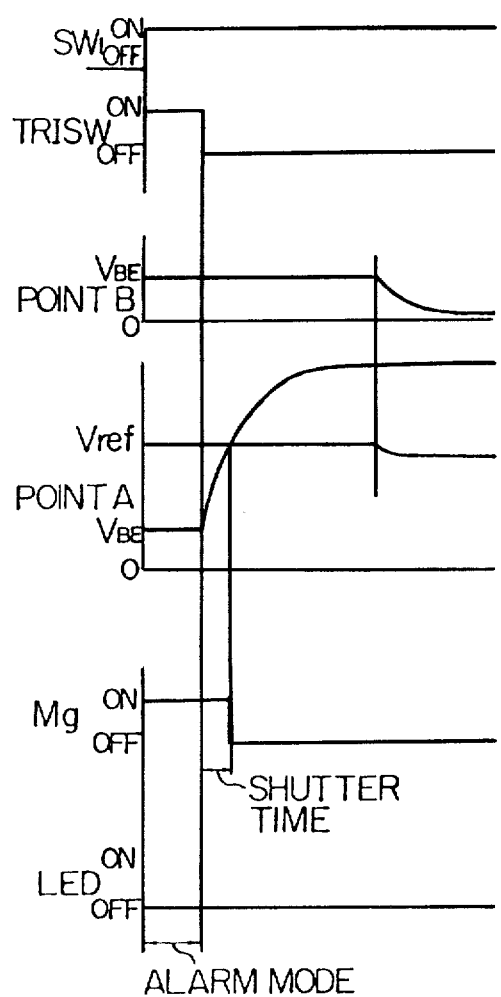
FIGS. 16 and 17 are the timing charts of the embodiment of FIG. 15.
Figure 17:
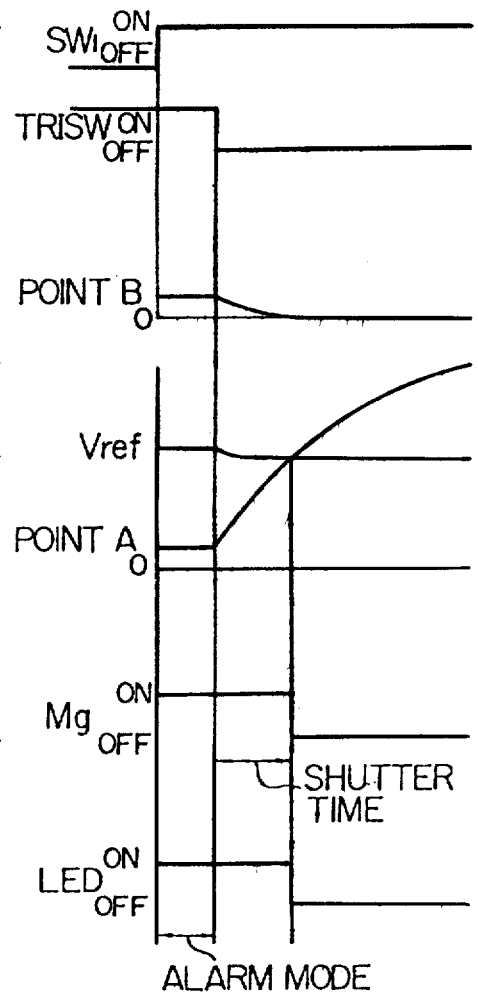

In FIG. 15, there is shown a seventh embodiment of the invention. In this embodiment, the light emitting diode LED is connected between the point A and the output terminal of the comparator COMP through the resistor R2, and the collector of the transistor TR2 is connected to the connecting point of the light emitting diode LED and the resistor R2. Therefore, when the power source is put to work, the output of the comparator COMP is set at a low level, so that, in the light, the transistor TR2 is turned on and the light emitting diode LED is extinguished while, in the dark, the transistor TR2 is turned off and the light emitting diode LED is lighted. The operation of this embodiment is shown in FIGS. 16 and 17. FIG. 16 shows the operation in the light while FIG. 17 shows the operation in the dark. In this embodiment, even if the trigger switch TRISW is of a type which closes only at the time of shutter set, the light emitting diode is not lighted after shutter operation.

Figure 18:
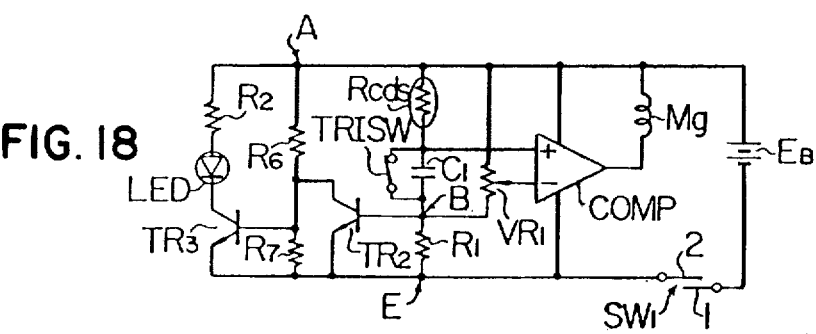

Referring to FIG. 18, there is shown an eighth embodiment of the invention. In this embodiment, an electric circuit comprising a transistor TR3, a resistor R6 and a resistor R7 is added to the sixth embodiment. The transistor TR3 is inserted between the light emitting diode LED and the point E, and the resistors R6 and R7 are connected in series between the points A and E, and the collector of the transistor TR2 and the base of the transistor TR3 are connected to the contact point of the resistors R6 and R7. Therefore, in the light, the transistor TR2 is on and the transistor TR3 is off, so that the light emitting diode LED is extinguished while, in the dark, the transistor TR2 is off and the transistor TR3 is on, so that the light emitting diode LED is lighted and the camera vibration alarm is performed. A battery is employed as the DC power source $E_B$. When the camera is directed to a dark place, the light emitting diode LED is lighted if the capacity of the battery $E_B$ is sufficient but, if the capacity of the battery $E_B$ is insufficient, the light emitting diode is not lighted, so that the battery $E_B$ can be checked.

In the above embodiment, when the power source $E_B$ has a sufficiently high voltage, one terminal of the variable resistor VR1 can be connected to the point E, without being connected to the point B.

In FIG. 19, there is shown a ninth embodiment of the invention. In the timer circuit of this embodiment, the point B is connected to the point E through the resistor R1, and the variable resistor VR1 is connected between the points A and E and, at the same time, the power source terminals of the comparator COMP are connected to the points A and E. Furthermore, between the points A and E, there is connected the camera vibration alarm light emitting diode LED through the resistor R2, and a thyristor SCR1 is connected in parallel with the light emitting diode LED, and the gate of the thyristor SCR1 is connected to the point B. The contact 1 of the switch SW1 is connected to a negative side terminal of the DC power source $E_B$, and the contacts 2 and 3 of the switch SW1 are respectively connected to the points E and B. A series circuit of a resistor R8 and a resistor R9 is connected in parallel with the light emitting diode LED through a synchronous contact X comprising the X-contact, and the contact point of the resistors R8 and R9 is connected to the gate of a thyristor SCR2 and is also connected to the base of a transistor TR4 through a switch SW2 and a resistor R10. The collector and the emitter of the transistor TR4 are respectively connected to the reverse input terminal of the comparator COMP and the point E, and the anode of the thyristor SCR2 is connected to one synchronous terminal T1, and the cathode of the thyristor SCR2 and the other synchronous terminal T2 are connected to the point E.

Figure 22:
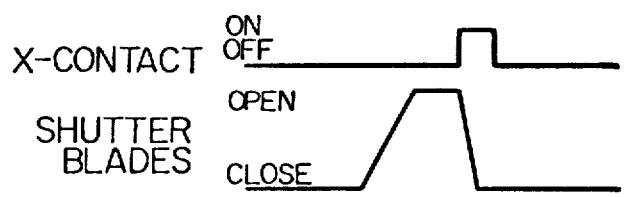

In the thus constructed electric circuit, when the contacts 1 and 2 of the switch SW1 are connected, with a light depression of the release button, the DC power source $E_B$ is connected between the points A and B. With the trigger switch TRISW on, a power source voltage VGS divided by the light receiving element Rcds and the resistor R1 is applied to the gate and the source of the thyristor SCR1. Therefore, when the subject is light, the light emitting diode LED is short-circuited and extinguished, with the thyristor SCR1 on. However, in the dark, the light emitting diode LED is lighted with the thyristor SCR1 off, so that the camera vibration alarm is performed. This is the alarm mode, and this state is held by the thyristor SCR1 irrespective of the stroke of the release button. When the contacts 1, 2 and 3 of the switch SW1 are connected, with a deeper depression of the release button, the resistor R1 is short-circuited by the switch SW1 and a timer circuit is formed, so that a timer mode is set. At this time, the timer circuit is operated as mentioned previously. The timer circuit is operated as shown in FIGS. 20 and 21. FIG. 20 shows the operation in the light, and FIG. 21 shows the operation in the dark. If a strobotron is connected to the synchronous terminals T1 and T2, the thyristor SCR2 is turned on when the X-contact is on in the dark, so that the strobotron emits lights. At this time, when the switch SW2 has been turned on in advance, with the X-contact X on, the transistor TR4 is turned on and the reference voltage Vref is reduced, so that the magnet Mg is energized. As a result, the shutter blades are closed in the timing as shown in FIG. 22. However, in the light, even if the X-contact is turned on, the thyristor SCR2 and the transistor TR1 are not turned on and accordingly the strobotron does not emit light.

In the thus constructed electric circuit, since the display of the light emitting diode LED is held by the thyristor SCR1, the previously mentioned adjustment in the conventional electric circuit becomes unnecessary and wrong display of the light emitting diode and the improper operation of the shutter are obviated. Furthermore, there are two types of trigger switches TRISW. In one type, the switch is closed only at the time of shutter set while, in the other type, the switch is closed except during shutter operation. When either type is used, the light emitting diode LED displays correctly.

Figure 23:
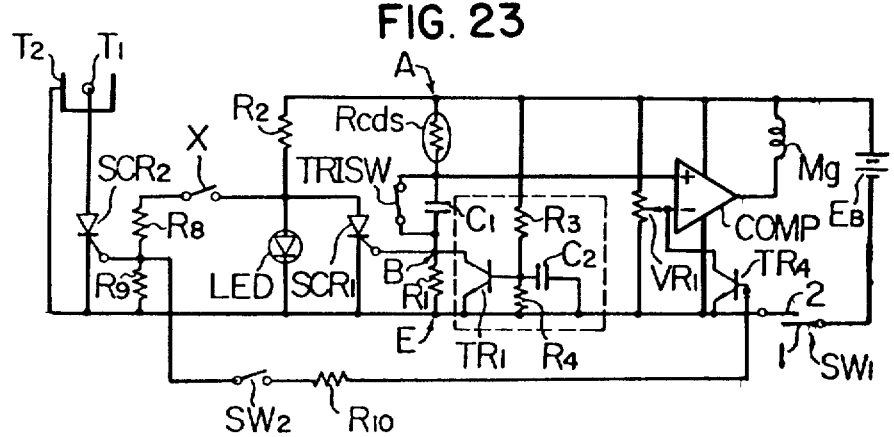
FIGS. 23 to 27 are the circuit diagrams of the further embodiments of the invention.

Referring to FIG. 23, there is shown a tenth embodiment of the invention. In this embodiment, the function of short-circuiting of the resistor R1 by the contacts 2 and 3 of the switch SW1 in the ninth embodiment is electrically performed by the transistor TR1 and the integration circuit within the broken line in FIG. 23. The switch SW1 has two contacts 1 and 2. The collector and the emitter of the transistor TR1 are connected to the two terminals of the resistor R1, and the base of the transistor TR1 is connected to the resistors R3 and R4. The resistors R3 and R4 are connected in series between the points A and E, and the condenser C2 is connected in parallel with the resistor R4. With the switch SW1 on, the power source voltage is integrated by the condenser C2 and the resistors R3 and R4 and, due to the output, the transistor TR1 is turned off, so that the camera vibration alarm mode is set, and the previously mentioned operation is performed. When the output of the integration circuit amounts to a voltage above a predetermined voltage, the resistor R1 is short-circuited with the transistor TR1 on, so that a timer circuit is formed. In this embodiment, since the switch SW1 has two contacts, the control of the stroke is easy.

Figure 24:
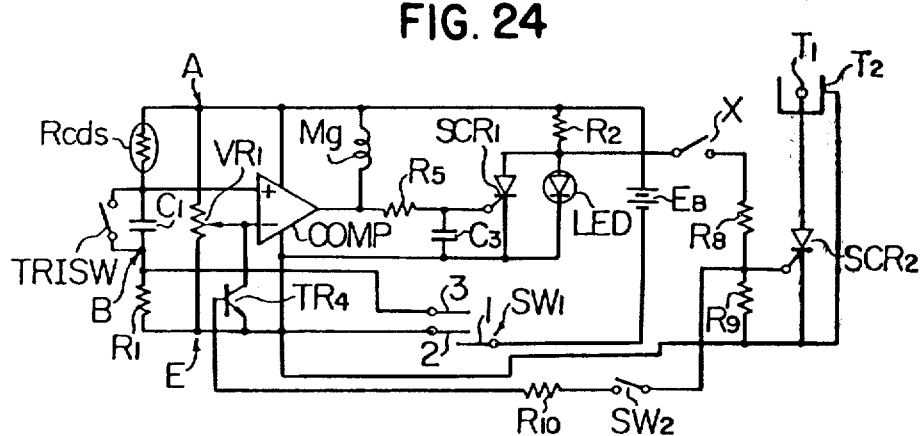

Referring to FIG. 24, there is shown an eleventh embodiment of the invention. In this embodiment, the gate of the thyristor SCR1 is connected to the output terminal of the comparator COMP through the resistor R5 in the ninth embodiment, and the condenser C3 is connected between the gate of the thyristor SCR1 and the point E. Therefore, at the time of the alarm mode, a voltage divided by the light receiving element Rcds and the resistor R1 is compared with the reference voltage Vref set by the variable resistor VR1 by the comparator COMP, and the output of the comparator COMP is applied between the gate and the source of the thyristor SCR1. Therefore, the light emitting diode LED is lighted with the thyristor SCR1 off in the dark while, in the light, the light emitting diode LED is extinguished with the thyristor SCR1 on. The condenser C3 serves to prevent the thyristor SCR1 from being erroneously turned on in the dark due to the operation lag of the comparator COMP. In the ninth embodiment, since the camera vibration is judged by use of the voltage between the gate and the source of the thyristor SCR1, the judgement greatly depends upon the voltage. However, in this embodiment, since the camera vibration is judged by use of the comparator COMP, the voltage dependence of the judgment is small.

Figure 25:
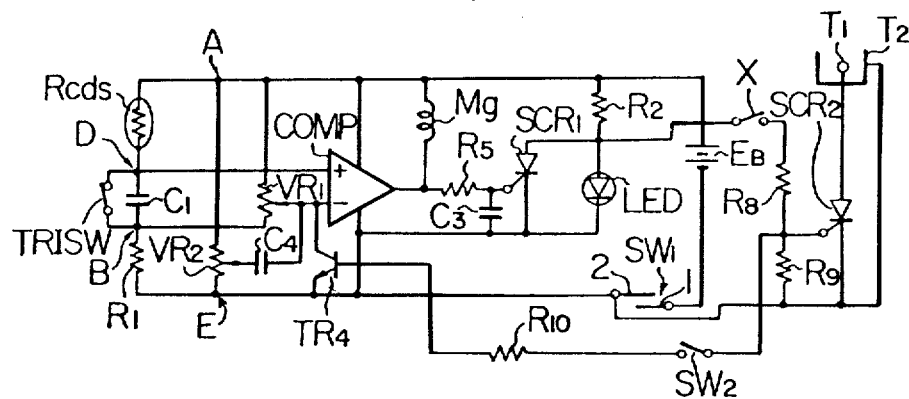

In FIG. 25, there is shown a twelfth embodiment of the invention. In this embodiment, the variable resistor VR1 is connected between the points A and B in the eleventh embodiment, so that a bridge circuit is formed by the variable resistor VR1, the light receiving element Rcds and the condenser C1. The switch SW1 has two contacts 1 and 2, and the contact 1 is connected to a negative side terminal of the DC power source $E_B$ and the contact 2 is connected to the point E. Both terminals of the variable resistor VR2 are connected to the points A and E, and a sliding terminal of the variable resistor VR2 is connected to the reverse input terminal of the comparator COMP through the condenser C4.

In the thus constructed electric circuit, when the contacts 1 and 2 of the switch SW1 are connected, with a light depression of the release button, the DC power source $E_B$ is connected between the points A and E. When the trigger switch TRISW is on, a voltage divided by the light receiving element Rcds and the resistor R1 is applied the comparator COMP. On the other hand, by putting the switch SW1 to work, the reference voltage set by the variable resistor VR2 is transiently applied to the comparator COMP through the condenser C4, and the reference voltage and the above-mentioned divided voltage are compared in the comparator COMP, and the output of the comparator COMP is applied between the gate and source of the thyristor SCR1 whereby, when the subject is light, the light emitting diode LED is extinguished with the thyristor SCR1 on while, in the dark, the light emitting diode LED is lighted with the thyristor SCR1 off, so that the camera vibration alarm is performed. This is the alarm mode. This state is held by the thyristor SCR1 irrespective of the stroke of the release button.

Figure 26:
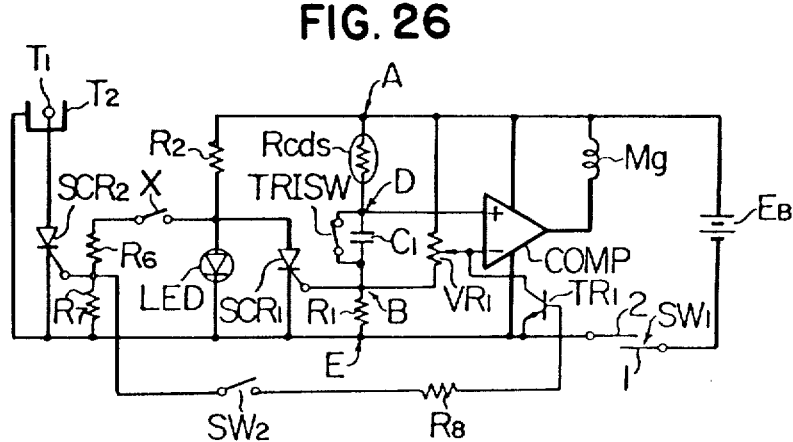

Referring to FIG. 26, there is shown a thirteenth embodiment of the invention. In this embodiment, the variable resistor VR2, the condensers C3 and C4 and the resistor R5 are omitted in the embodiment as shown in FIG. 25, and the gate of the thyristor SCR1 is connected to the point B. Therefore, in the alarm mode, a voltage divided by the light receiving element Rcds and the resistor R1 is applied to the gate and source of the thyristor SCR1, and the thyristor SCR1 is operated as mentioned previously. Furthermore, in the timer mode, the potential of the point B is locked at about 0.65 volts which is the voltage between the gate and the source of the thyristor SCR1, so that the shutter time is maintained accurately.

Figure 27:
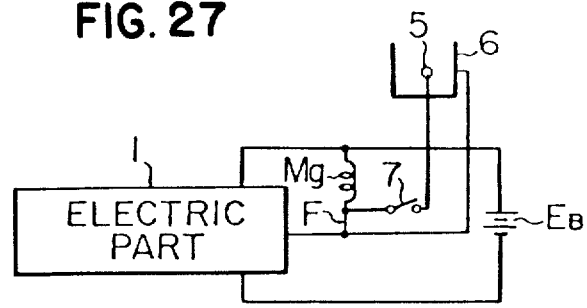
Figure 28:
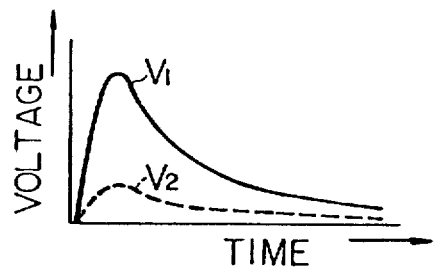
FIGS. 28 to 31 are the graph and circuit diagrams for explaining the embodiment of FIG. 27 and the conventional circuit.
Figure 29:
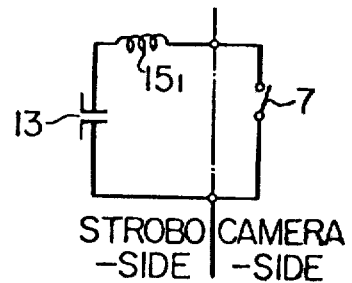
Figure 30:
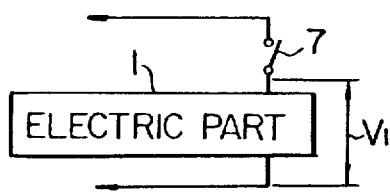
Figure 31:
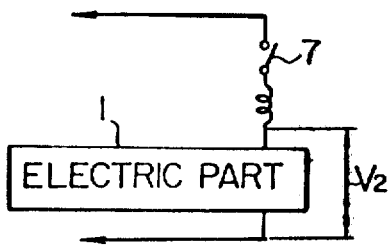

In a fourteenth embodiment of the invention, part of the wiring for the X-contact 7 is replaced with a part F of a magnet driving signal wire for an electro-shutter as shown in FIG. 27 in the electric circuit of an electro-shutter type camera having the X-contact. When the X-contact 7 is closed with the part F of the magnet driving signal wire disconnected, the voltage charged in a trigger condenser 13 is applied to the output terminal of the electric part 1 through the magnet Mg and to the power source positive line as shown in FIG. 31. At this time, the magnet Mg exhibits the property as a coil and is connected to be of a high resistance in a transient state. Moreover, the X-contact 7 closes only a short time. Therefore, a voltage V2 applied to the electric part 1 from the output terminal and the power source positive line is reduced as shown by broken line in FIG. 28, so that the electric part 1 is not damaged.

Figure 32:
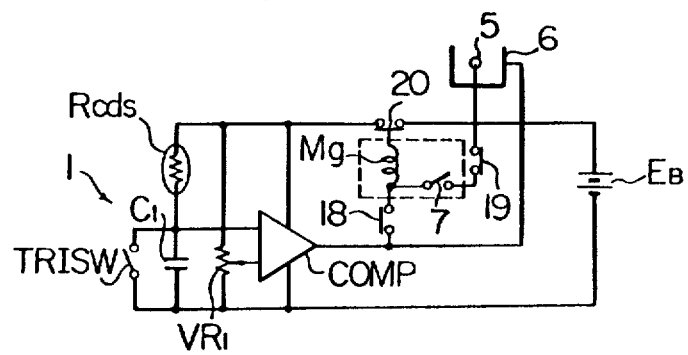
FIG. 32 is the circuit diagram of a still further embodiment of the invention.

In FIG. 32, there is schematically shown a further embodiment of the invention, in which the magnet Mg and the X-contact 7 are separated from the electric part 1. In this embodiment, the connecting portion of the electric part 1 and the terminal 5 are connected to the connecting portion of the magnet Mg and the X-contact 7 by a connecting device 18. The X-contact 7 and a terminal 5 are connected by a contact of a connecting device 19, and the magnet Mg, the electric part 1 and a battery $E_B$ are connected by the contact of a connecting device 20. The electric part 1 is an electro-shutter, for example, such an electric circuit as in the above-mentioned embodiment. Giving an outline of the electric part 1, a light receiving element Rcds for exposure photometry and a condenser C1 are connected in series with the opposite terminals of a battery $E_B$. A trigger switch TRISW is connected in parallel with the condenser C1, and the connecting point of the light receiving element Rcds and the condenser C1 is connected to a non-reverse terminal of the comparator COMP. The power source terminals of the comparator COMP are connected to the two terminals of the battery $E_B$, and the reverse input terminal is connected to a sliding terminal of a variable resistor VR1, and the variable resistor VR1 is connected to the two terminals of the battery $E_B$. When the release button is depressed, the trigger switch TRISW is opened together with the mechanical release, and the integration is initiated by the light receiving element Rcds and the condenser C1. The integrated output is compared with the reference voltage set by the variable resistor VR1 by the comparator COMP. When the output of the comparator COMP increases up to a high level, the magnet Mg is deenergized so that the shutter is closed. In the X-contact circuit, since part of the wiring of the X-contact is replaced with the magnet having signal wire for the electro-shutter, damage of the electric part can be prevented.

What is claimed is:
1. An electric circuit for use with a camera comprising a shutter, said circuit comprising:
   an electromagnet for controlling said shutter;
   an integrating circuit comprising light responsive means, a condenser, and a resistor;
   trigger switch means connected to said condenser to short-circuit the condenser under selective conditions and to allow a voltage to build up in said condenser during exposures;
   actuating means connected to said integrating circuit to be controlled thereby, said actuating means being connected to said electromagnet to actuate said electromagnet when voltage across said condenser reaches a predetermined value;
   a switching element operated by a signal from a current flowing through said resistor;
   alarm means connected to said switching element to be controlled thereby;
   terminals for synchronizing a flash source;
   a thyristor comprising an output circuit connected in series with said terminals;
   an X contact connected to said power supply means and connected to an input terminal of said thyristor;
   said switching element comprising a second thyristor connected to said X contact and having an input terminal; and
   circuit means connecting said light responsive means to said input terminal of said second thyristor to cause said second thyristor to be conductive when there is sufficient light to make it unnecessary to use a flash source, said second thyristor connecting said X contact to a source of potential to prevent said first thyristor from becoming conductive when said second thyristor is conductive.
2. The electric circuit as claimed in claim 1, comprising, in addition:
   voltage divider means connected to said power supply to produce a reference voltage, said actuating means comprising a comparison circuit having a first input terminal connected to said integrating circuit and a second input terminal connected to said voltage divider to derive said reference voltage therefrom;
   a transistor having an output circuit connected between said second input terminal of said comparison circuit and one end of said voltage divider to actuate said electromagnet when said transistor is conductive; and
   circuit means connecting said input terminal of said first thyristor to a control terminal of said transistor to cause said transistor to be conductive when said first thyristor is made conductive and to prevent said transistor from being conductive when said first thyristor is prevented from being conductive.
3. The electric circuit as claimed in claim 2, in which said input terminal of said second thyristor and a second terminal of said second thyristor comprise an input circuit for said second thyristor connected across said resistor.

* * * * *